(12) United States Patent
Padilla et al.

(10) Patent No.: US 10,605,371 B2
(45) Date of Patent: Mar. 31, 2020

(54) VALVE ASSEMBLY WITH ADJUSTABLE SPRING SEAT

(71) Applicant: Aerojet Rocketdyne, Inc., Sacramento, CA (US)

(72) Inventors: Mario Padilla, Los Angeles, CA (US); Gary Grenon, Camarillo, CA (US)

(73) Assignee: AEROJET ROCKETDYNE, INC., Canoga Park, CA (US)

( * ) Notice: Subject to any disclaimer, the term of this patent is extended or adjusted under 35 U.S.C. 154(b) by 166 days.

(21) Appl. No.: 15/548,431

(22) PCT Filed: Jan. 26, 2016

(86) PCT No.: PCT/US2016/014807
§ 371 (c)(1),
(2) Date: Aug. 3, 2017

(87) PCT Pub. No.: WO2016/130309
PCT Pub. Date: Aug. 18, 2016

(65) Prior Publication Data
US 2018/0023710 A1    Jan. 25, 2018

Related U.S. Application Data

(60) Provisional application No. 62/115,543, filed on Feb. 12, 2015.

(51) Int. Cl.
| F16K 3/32 | (2006.01) |
| G05D 16/10 | (2006.01) |
| F16K 11/07 | (2006.01) |
| F16K 31/122 | (2006.01) |

(52) U.S. Cl.
CPC ............ *F16K 3/32* (2013.01); *F16K 11/0716* (2013.01); *F16K 31/1221* (2013.01); *G05D 16/10* (2013.01)

(58) Field of Classification Search
CPC .... F16K 11/0716; F16K 31/1221; F16K 3/32; G05D 16/10
See application file for complete search history.

(56) References Cited

U.S. PATENT DOCUMENTS 5,392,807 A * 2/1995 Caudle ................ F16K 31/1221
137/316

FOREIGN PATENT DOCUMENTS

| CN | 101424465 | 5/2009 |
| EP | 0146200 | 6/1985 |
| FR | 2500186 | 8/1982 |
| GB | 1532411 | 11/1978 |
| GB | 2184814 | 7/1987 |

OTHER PUBLICATIONS

International Search Report for International Application No. PCT/US2016/014807 completed May 18, 2016.
International Preliminary Report on Patentability for PCT/US2016/014807 dated Aug. 24, 2017.

* cited by examiner

*Primary Examiner* — P. MacAde Nichols

(57) ABSTRACT

A valve assembly includes a valve body, a first spring seat disposed within the valve body, a preload spring disposed within the valve body and mated with the first spring seat, and a second spring seat disposed within the valve body and mated with the preload spring. The second spring seat is adjustably mated to the valve body.

9 Claims, 4 Drawing Sheets

VALVE ASSEMBLY WITH ADJUSTABLE SPRING SEAT

CROSS-REFERENCE TO RELATED APPLICATION

The present disclosure claims priority to U.S. Provisional Patent Application No. 62/115,543, filed Feb. 12, 2012.

BACKGROUND

Valves, regulators, and other flow-control mechanisms typically include a spring that is used to apply a bias force to a valve or regulator member. For example, the spring biases the valve or regulator member to a default open or closed position. When fluid pressure in the valve or regulator exceeds the bias force of the spring, the valve or regulator member moves and compresses the spring. The movement of the valve or regulator member changes the flow through the valve or regulator.

SUMMARY

A valve assembly according to an example of the present disclosure includes a valve body, a first spring seat disposed within the valve body, a preload spring disposed within the valve body and mated with the first spring seat, and a second spring seat disposed within the valve body and mated with the preload spring. The second spring seat is adjustably mated to the valve body.

A further embodiment of any of the foregoing embodiments include an end cap that is mated to the second spring seat and that is fixedly detachable with the valve body.

In a further embodiment of any of the foregoing embodiments, the end cap is fixedly detachable with the valve body via at least one fastener.

In a further embodiment of any of the foregoing embodiments, the end cap includes at least one elongated slot through which the at least one fastener is fixedly attachable to the valve body.

In a further embodiment of any of the foregoing embodiments, the second spring seat is adjustably mounted in the valve body on threads.

In a further embodiment of any of the foregoing embodiments, the end cap is rotatable and the second spring seat is engaged with the end cap in a keyed joint such that rotation of the end cap rotates the second spring seat on the threads to change a position of the second spring seat.

In a further embodiment of any of the foregoing embodiments, the keyed joint includes at least one arm and at least one opening, and the at least one arm extends through the at least one opening such that the end cap and the second spring seat are rotationally locked together.

In a further embodiment of any of the foregoing embodiments, the at least one arm is radially offset from a central axis of rotation of the end cap.

In a further embodiment of any of the foregoing embodiments, the at least one arm has a tip end that defines a bound of a range of movement of the first spring seat beyond which the first spring seat cannot compress the preload spring against the second spring seat.

A further embodiment of any of the foregoing embodiments include a valve member that is moveable against the preload spring through the first spring seat.

A valve assembly according to an example of the present disclosure includes a valve body that defines at least one valve passage and a preload spring within the valve body. The preload spring includes a first end and a second end, a first spring seat within the valve body at the first end of the preload spring, a valve member disposed in the at least one valve passage and moveable against the preload spring through the first spring seat, and a second spring seat within the valve body at the second end of the preload spring. The second spring seat is mounted in the valve body on threads, and a rotatable end cap is fixedly detachable with the valve body. The rotatable end cap is engaged in a keyed joint with the second spring seat such that rotation of the end cap rotates the second spring seat on the threads to change a set position of the second spring seat.

In a further embodiment of any of the foregoing embodiments, the keyed joint includes at least one arm and at least one opening, and the at least one arm extends through the at least one opening such that the rotatable end cap and the second spring seat are rotationally locked together.

In a further embodiment of any of the foregoing embodiments, the at least one arm is radially offset from a central axis of rotation of the rotatable end cap.

In a further embodiment of any of the foregoing embodiments, the at least one arm has a tip end that defines a bound of a range of movement of the first spring seat beyond which the first spring seat cannot compress the preload spring against the second spring seat.

In a further embodiment of any of the foregoing embodiments, rotation of the rotatable end cap does not change an axial position of the tip end along the axis of rotation of the rotatable end cap.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1A:
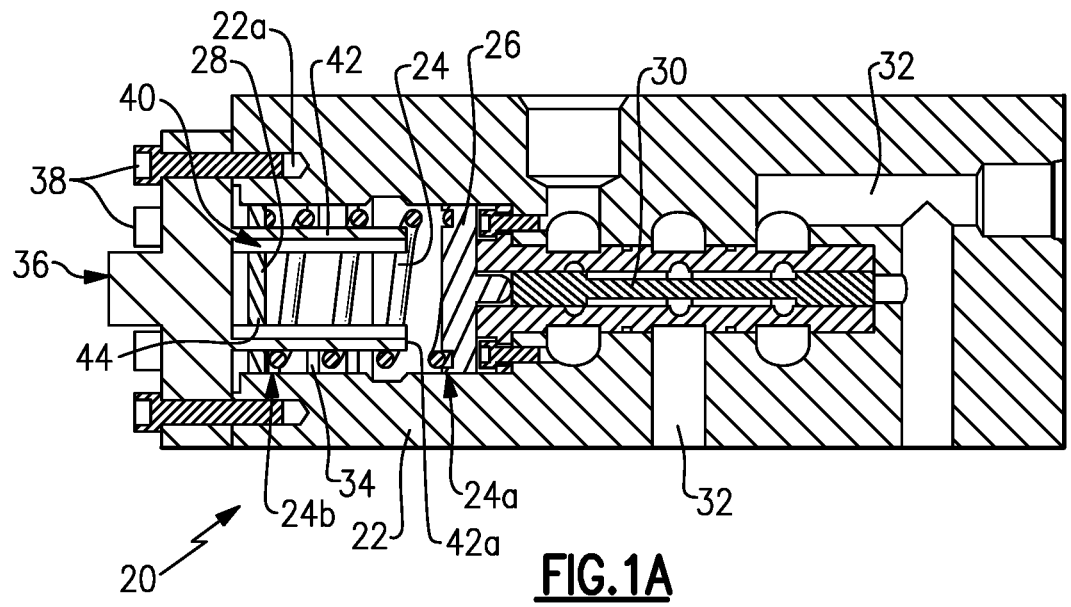
FIG. 1A illustrates an example valve assembly that includes an adjustable spring seat. The valve assembly is shown in a default, non-actuated state.

FIG. 1A schematically illustrates an example valve assembly 20. As will be described, the valve assembly 20 is adjustable with respect to the amount of spring force provided by an internal preload spring.

The valve assembly 20 includes a valve body 22 that houses a preload spring 24. For example, although not limited, the preload spring 24 can be a helical coil spring that generally extends about a central axis A. The preload spring 24 includes a first end 24a and a second end 24b. A first spring seat 26 is situated within the valve body 22 at the first end 24a of the preload spring 24. A second spring seat 28 is situated within the valve body 22 at the second end 24b of the preload spring 24. The preload spring 24 is mated, or attached, with the first spring seat 26 and the second spring seat 28.

During operation of the valve assembly 20 the second spring seat 28 is stationary and the first spring seat 26 is movable against the spring force of the preload spring 24. For example, the valve assembly 20 includes a valve member 30 that is situated in one or more valve passages 32 in the valve body 22. The position of the valve member 30 controls fluid flow through the valve assembly 20. In the illustrated example, the valve member 30 is a three-way valve; however, it is to be appreciated that the examples herein are also applicable to other types of valves or regulators.

Figure 1B:
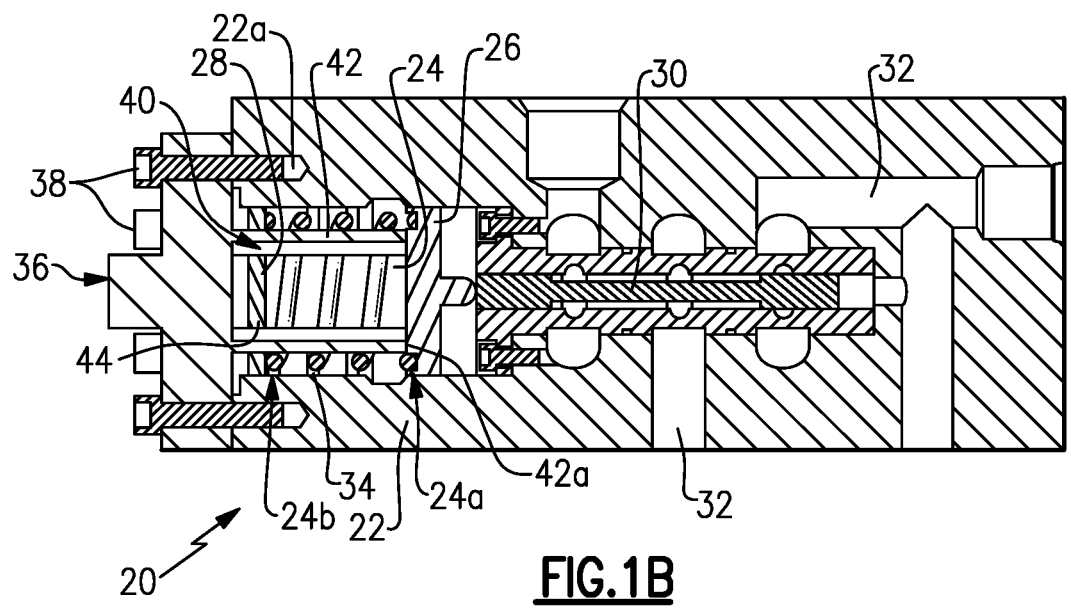
FIG. 1B shows the valve assembly of FIG. 1A but in an actuated state.

The valve member 30 is movable through the first spring seat 26 against the spring force of the preload spring 24. For example, the valve member 30 is pressure-actuated. When the fluid pressure behind the valve member 30 exceeds the spring force of the preload spring 24 the valve member 30 compresses the preload spring 24, as shown in FIG. 1B. When the fluid pressure is less than the spring force, the preload spring 24 biases the valve member 30 to a default position, which is shown in FIG. 1A.

The magnitude of the spring force depends upon the amount of initial compression of the preload spring 24. The amount of initial compression in turn depends on the position of the second spring seat 28 in the valve assembly 20. The position of the second spring seat 28 can be adjusted to change the spring force and thus adjust the pressure at which the valve member 30 actuates. In this regard, the second spring seat 28 is adjustably mated to the valve body 22. In the illustrated example, the second spring seat 28 is mounted in the valve body 22 on threads 34. Rotation of the second spring seat 28 in a clockwise or counterclockwise direction thus changes the axial position of the second spring seat 28 along the central axis A. This varies the spring preload.

The valve assembly 20 further includes an end cap 36 that enables a user to adjust the position of the second spring seat 28. The end cap 36 is fixably detachable with the valve body 22. For example, the end cap 36 can be fixed, or secured, with the valve body 22 using one or more fasteners 38. The end cap 36 is detachable from the valve body 22 by removing the one or more fasteners 38.

The second spring seat 28 is engaged with the end cap 36 in a keyed joint 40. The keyed joint 40 rotationally locks the end cap 36 and the second spring seat 28 together. Rotation of the end cap 36 about central axis A (when the fasteners 38 are removed) thus rotates the second spring seat 28 via the keyed joint 40.

Figure 2:
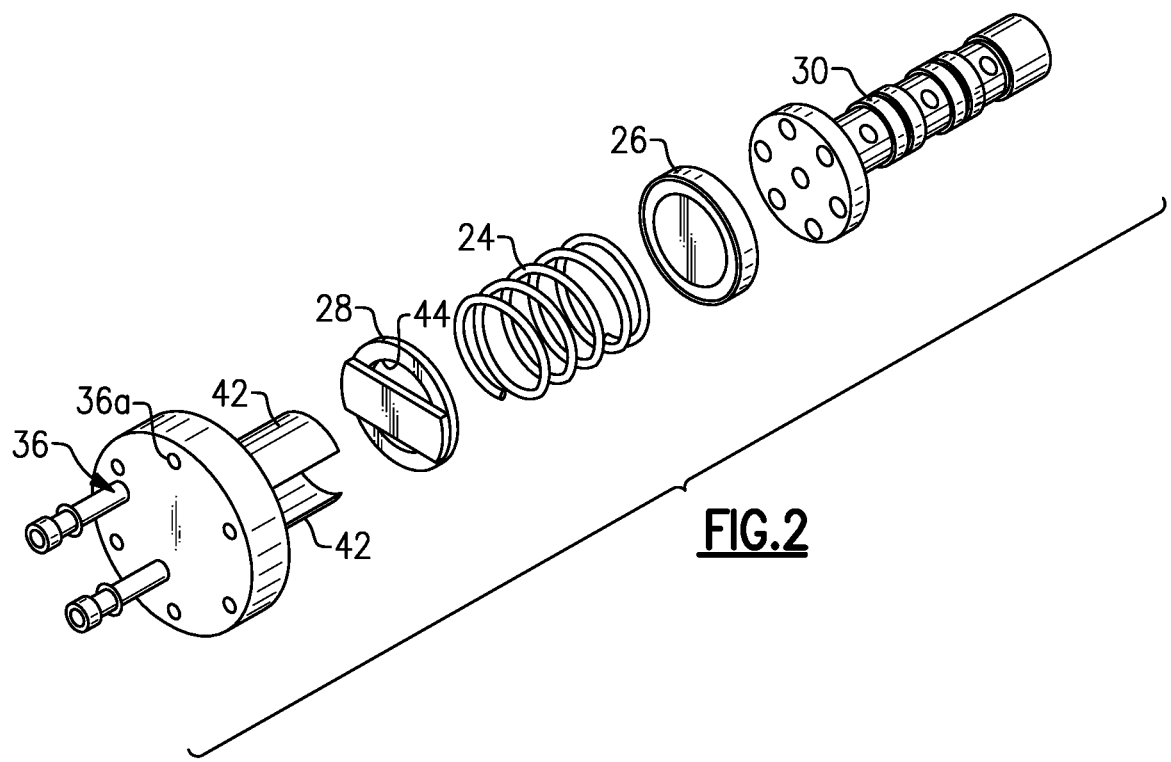
FIGS. 2 and 3 each illustrate exploded views of selected portions of a valve assembly.
Figure 3:
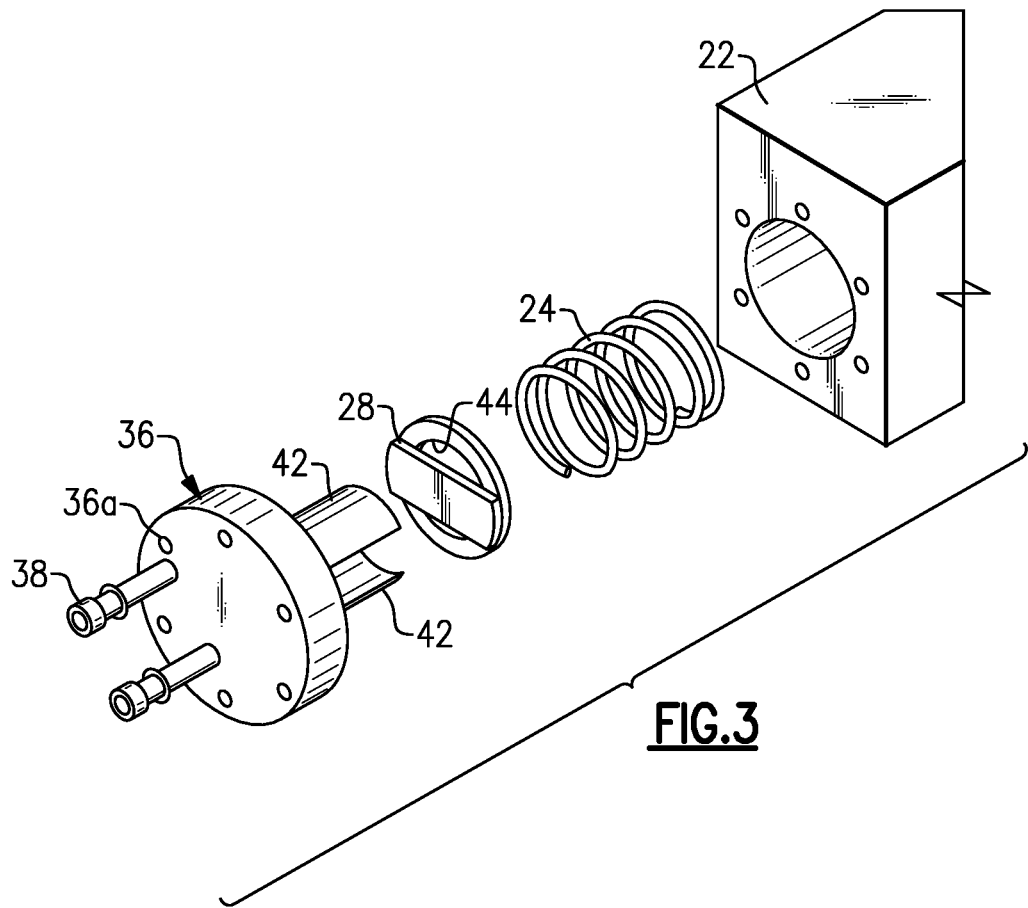

Referring also to FIGS. 2 and 3, which show exploded views of selected portions of the valve assembly 20, the keyed joint 40 includes at least one arm 42 (two shown) and at least one opening 44 (two shown). In this example, the arms 42 are on the end cap 36 and the openings 44 are in the second spring seat 28. As will be appreciated, the end cap 36 could alternatively be configured with the openings 44 and the second spring seat 28 could be configured with the arms 42.

The arms 42 extend through the openings 44 and thus rotationally lock the second spring seat 28 and end cap 36 together. In this regard, the cross-sectional geometry of the arms 42 corresponds to the cross-sectional geometry of the openings 44 so that the arms 42 fit into the openings 44. Upon clockwise or counterclockwise rotation of the end cap 36 when the fasteners 38 are removed, the arms 42 rotate the second spring seat 28. The rotation moves the second spring seat 28 axially via the threads 34 to change the set position of the second spring seat 28.

In the illustrated example, the arms 42 are generally radially offset from the central axis A. The offset ensures that the arms 42 generate a moment force on the second spring seat 28, to rotate the second spring seat 28 when the end cap 36 is rotated. Additionally, although it is conceivable that a single, exclusive arm 42 could be used, multiple arms 42 that are uniformly circumferentially spaced as shown may provide a more uniform application of rotational force on the second spring seat 28. The uniform application of rotational force may reduce the potential that the second spring seat 28 jams on the threads 34.

The end cap 36 can be rotated incrementally between rotational positions in which holes 36a in the end cap 36 align with corresponding holes 22a in the valve body 22. The size of the rotational increments depends upon the number of pairs of holes 22a/36a provided. For example, eight pairs of circumferentially-spaced holes 22a/36a provides rotational increments of 45°, six pairs of circumferentially-spaced holes 22a/36a provides increments of 60°, and four pairs of circumferentially-spaced holes 22a/36a provides increments of 90°.

Additionally, the rotational increments and pitch of the threads 34 can be configured to provide a predetermined incremental magnitude of axial movement of the second spring seat 28 for a given increment of rotation of the end cap 36. Coupled with Hooke's Law and knowledge of the spring constant of the preload spring 24, the spring force can readily be calculated for given incremental magnitudes of axial movement of the second spring seat 28.

Once the position of the second spring seat 28 is set, the fasteners 38 are inserted through holes 36a in the end cap 36 and secured to the valve body 22. The securing of the end cap 36 to the valve body 22 prevents rotation of the end cap 36 and thus also prevents rotation of the second spring seat 28. The fasteners 38 therefore also serve to indirectly lock second spring seat 28 in a stationary set position. The adjustment of the second spring seat 28 therefore does not require complete removal of the end cap 36 or opening of the valve assembly to directly access the second spring seat 28. Once the adjustment is locked, the pre-load is repeatable and reliable in that it will not change during operational use.

Figure 4A:
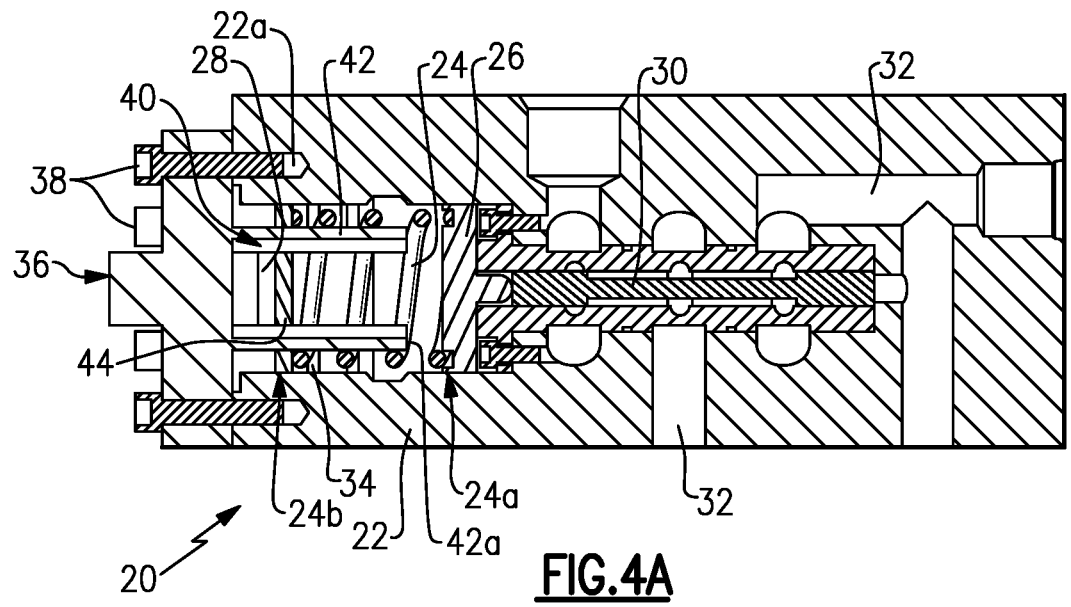
FIG. 4A illustrates the valve assembly of FIG. 1A, but with a spring seat adjusted to a different set position. The valve assembly is shown in a default, non-actuated state.
Figure 4B:
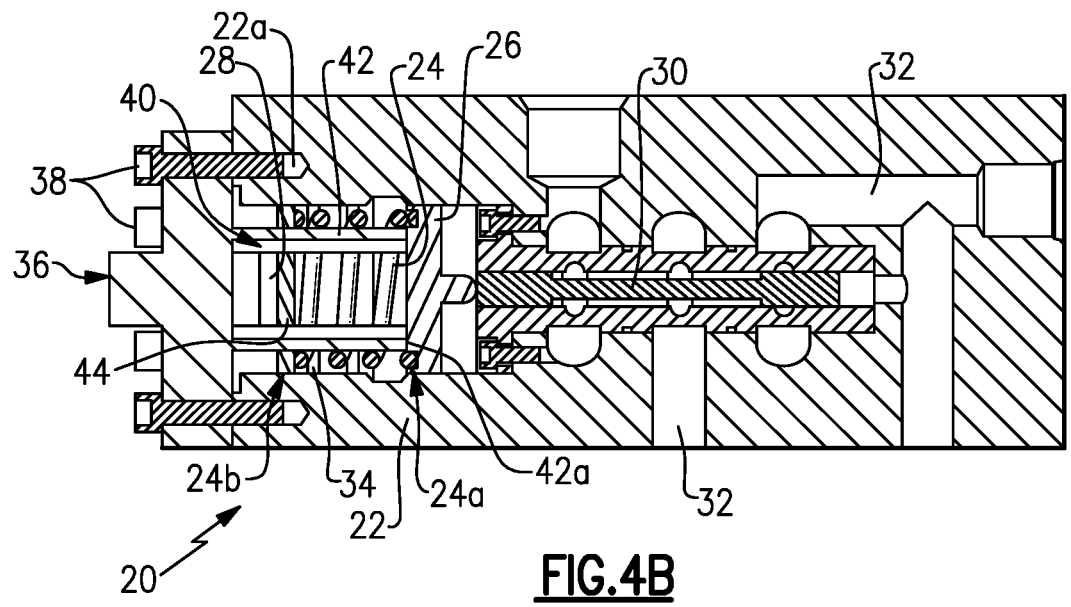
FIG. 4B shows the valve assembly of FIG. 4A but in an actuated state.

In this manner, the set position of the second spring seat 28 can be adjusted in order to adjust the magnitude of the spring force of the preload spring 24. For example, in FIG. 1A, the stationary set position of the second spring seat 28 is toward the left side of the valve body 22. In this state of compression the preload spring 24 provides a relatively low spring force on the first spring seat 26 and valve member 30. As shown in FIG. 4A, the stationary set position of the second spring seat 28 is farther to the right. In this state of greater compression the preload spring 24 provides a relatively higher spring force on the first spring seat 26 and valve member 30. As can be appreciated, the second spring seat 28 can also be adjusted to other stationary set positions to provide additional spring forces. When the fluid pressure behind the valve member 30 exceeds the spring force of the preload spring 24 the valve member 30 compresses the preload spring 24, as shown in FIG. 4B. When the fluid pressure is less than the spring force, the preload spring 24 biases the valve member 30 to a default position, which is shown in FIG. 4A.

In the actuated state as shown in FIGS. 1b and 4B, the valve member 30 actuates against the first spring seat 26 to compress the preload spring 24. In this regard, the arm or arms 42 also serve as a stop. For example, each of the arms 42 includes a tip end 42a that defines a bound of a range of movement of the first spring seat 26 beyond which the first spring seat 26 cannot compress the preload spring 24 against the second spring seat 28. Although the end cap 36 is rotatable, the end cap 36 itself does not move axially. Thus, the position of the stop provided by the tip ends 42a of the arms 42 is constant and ensures that the available stroke of the valve member 30 is constant for a given spring set position even though the spring force may change.

Figure 5:
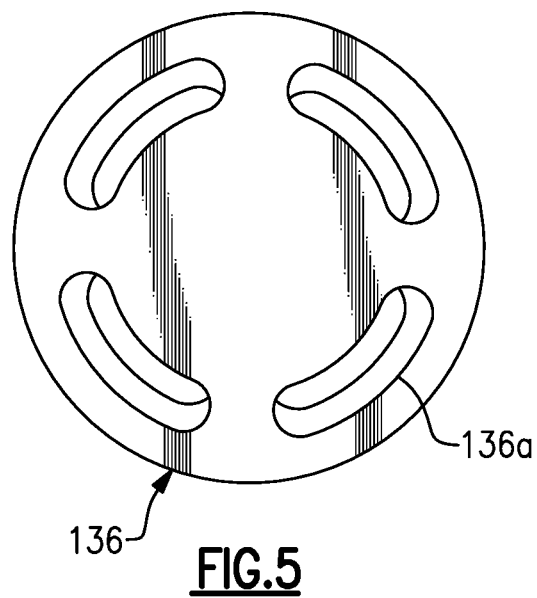
FIG. 5 illustrates an end cap of a valve assembly in which the end cap includes elongated slots.

FIG. 5 illustrates a modified example of an end cap 136. In this example, the end cap 136 includes elongated slots 136a through which the fasteners 38 can be inserted to secure the end cap 136 to the valve body 22. The elongated slots 136a are arced and provide an ability to "fine-tune" the stationary set position of the second spring seat 28. For example, the end cap 136 can be rotated clockwise or counterclockwise between rotational positions in which the elongated slots 136a align with the holes 22a. Upon adjustment to an aligned position, the end cap 136 can further be rotated by small amounts corresponding to the arc length of the elongated slots 136a to fine-tune the set position of the second spring seat 28.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A valve assembly comprising:
   a valve body;
   a first spring seat disposed within the valve body;
   a preload spring disposed within the valve body and mated with the first spring seat; and
   a second spring seat disposed within the valve body and mated with the preload spring, the second spring seat being adjustably mounted in the valve body on threads; and
   an end cap that is mated to the second spring seat and that is fixedly detachable with the valve body, wherein the end cap is rotatable and the second spring seat is engaged with the end cap in a keyed joint such that rotation of the end cap rotates the second spring seat on the threads to change a position of the second spring seat.

2. The valve assembly as recited in claim 1, wherein the keyed joint includes at least one arm and at least one opening, and the at least one arm extends through the at least one opening such that the end cap and the second spring seat are rotationally locked together.

3. The valve assembly as recited in claim 2, wherein the at least one arm is radially offset from a central axis of rotation of the end cap.

4. The valve assembly as recited in claim 2, wherein the at least one arm has a tip end that defines a bound of a range of movement of the first spring seat beyond which the first spring seat cannot compress the preload spring against the second spring seat.

5. A valve assembly comprising:
   a valve body defining at least one valve passage;
   a preload spring within the valve body, the preload spring including a first end and a second end;
   a first spring seat within the valve body at the first end of the preload spring;
   a valve member disposed in the at least one valve passage and moveable against the preload spring through the first spring seat;
   a second spring seat within the valve body at the second end of the preload spring, the second spring seat being mounted in the valve body on threads; and
   a rotatable end cap fixedly detachable with the valve body, the rotatable end cap being engaged in a keyed joint with the second spring seat such that rotation of the end cap rotates the second spring seat on the threads to change a set position of the second spring seat.

6. The valve assembly as recited in claim 5, wherein the keyed joint includes at least one arm and at least one opening, and the at least one arm extends through the at least one opening such that the rotatable end cap and the second spring seat are rotationally locked together.

7. The valve assembly as recited in claim 6, wherein the at least one arm is radially offset from a central axis of rotation of the rotatable end cap.

8. The valve assembly as recited in claim 6, wherein the at least one arm has a tip end that defines a bound of a range of movement of the first spring seat beyond which the first spring seat cannot compress the preload spring against the second spring seat.

9. The valve assembly as recited in claim 8, wherein rotation of the rotatable end cap does not change an axial position of the tip end along the axis of rotation of the rotatable end cap.

* * * * *